No. 694,192. Patented Feb. 25, 1902.
W. C. RASTETTER.
VEHICLE WHEEL.
(Application filed Apr. 20, 1901.)
(No Model.) 2 Sheets—Sheet 1.
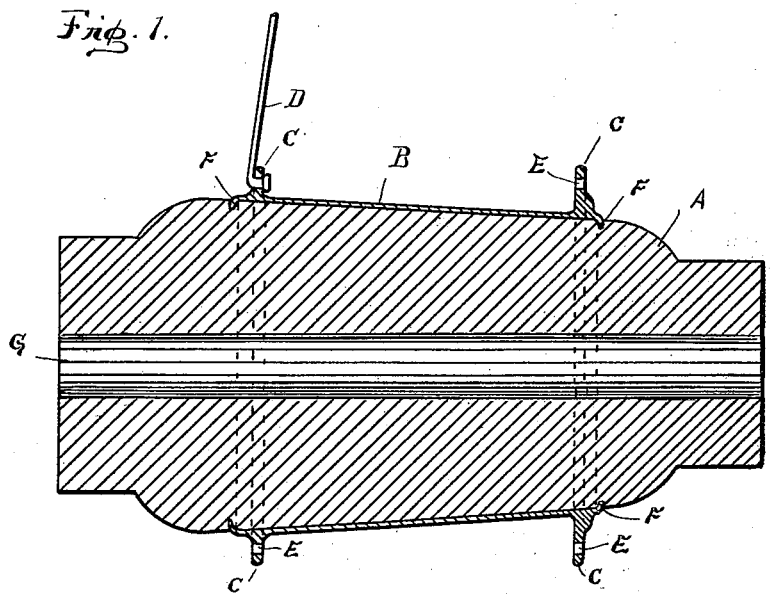
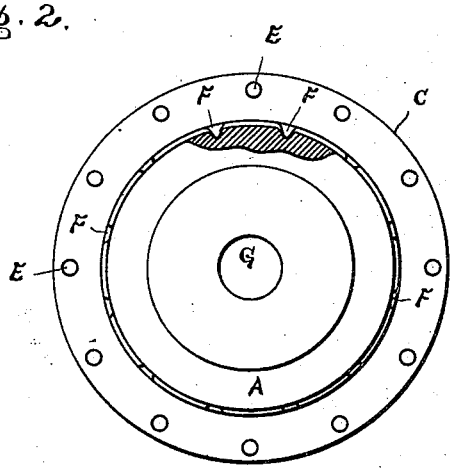
WITNESSES: William C. Rastetter INVENTOR
BY
ATTORNEY
THE NORRIS PETERS CO., PHOTO-LITHO., WASHINGTON, D. C.

No. 694,192.  
W. C. RASTETTER.  
VEHICLE WHEEL.  
(Application filed Apr. 20, 1901.)  
Patented Feb. 25, 1902.

(No Model.)  
2 Sheets—Sheet 2.

WITNESSES:  
INVENTOR  
William C. Rastetter  
BY  
ATTORNEY

UNITED STATES PATENT OFFICE.

WILLIAM C. RASTETTER, OF FORT WAYNE, INDIANA.

VEHICLE-WHEEL.

SPECIFICATION forming part of Letters Patent No. 694,192, dated February 25, 1902.

Application filed April 20, 1901. Serial No. 56,737. (No model.)

*To all whom it may concern:*

Be it known that I, WILLIAM C. RASTETTER, a citizen of the United States, residing at Fort Wayne, in the county of Allen and State of Indiana, have invented certain new and useful Improvements in Wheels for Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in wheels for vehicles wherein metal flanges are secured to a hub of wood for the purpose of attaching wire spokes; and the object of my improvement is to afford means for effectively securing wire spokes to a wooden hub.

I accomplish my object by the construction illustrated by the accompanying drawings, in which—

Figure 3:
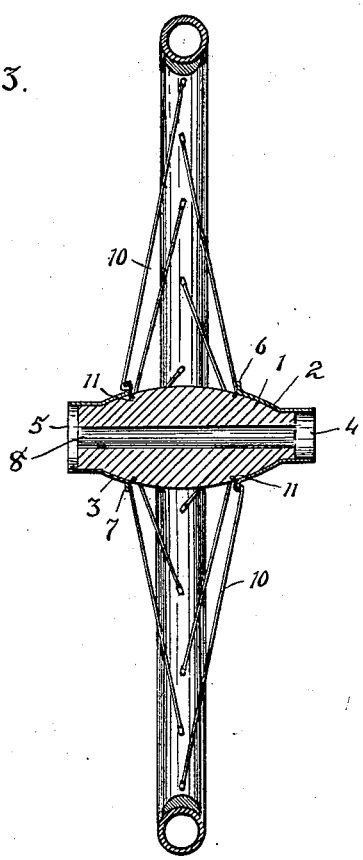

Figure 1 is a vertical longitudinal section of my hub, showing the flanges attached. Fig. 2 is a front end view of Fig. 1. Fig. 3 is a vertical section of a wheel, showing a modified form of my invention; and Fig. 4 is a front end view of the hub shown in Fig. 3.

My invention consists of a hub A, constructed of wood, and is preferably tapering throughout its middle portion. A barrel B, of metal, is provided with radial flanges C near its ends, and a number of holes E are made in said flanges for the purpose of securing the spokes D, which are of wire, such as are used in the construction of bicycle-wheels. At the outer ends of said barrel are a number of projecting teeth F, which are adapted to be forced into the wooden hub when the barrel has been driven tightly upon said hub, thus permanently securing said barrel in place. A hole G of small diameter is made longitudinally through the hub, so that the hub may be subsequently counterbored to suit any particular form of bearing which may be required.

Figure 4:
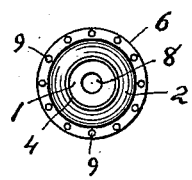

In Figs. 3 and 4 are shown a modified form, in which the hub 1 is greatest in diameter at its center and tapers toward its ends. In this instance two barrels 2 and 3 are driven upon the tapering outer ends of the hub and are held in place by driving the teeth 11 into the wood. These barrels have radial flanges 6 and 7, respectively, near their inner ends, and sleeves 4 and 5, respectively, which extend to or out from the ends of the hub. Wire spokes 10 are secured to the flanges in suitable holes 9, made for that purpose. A hole 8 is made in the hub 1 for the same purpose as that in the former construction.

Having described my invention, what I claim as new, and desire to secure by Letters Patent, is—

1. In a wheel for vehicles, in combination, a hub of wood; a metal barrel having radial flanges at its ends for the attachment of wire spokes; and a number of teeth projecting from the ends of said barrel, said teeth being adapted to be forced into the wood after said barrel has been driven tightly upon said hub, for the purpose of permanently securing said barrel to the hub.

2. In a wheel for vehicles, in combination, a hub of wood having a tapering central portion; a metal tapering barrel having a radial flange at each of its ends for the attachment of wire spokes; and a number of teeth extending from the ends of said barrel, said teeth being adapted to be driven into the wood after said barrel has been driven upon said hub, for the purpose of securing said barrel in place.

In testimony whereof I affix my signature in presence of two witnesses.

WILLIAM C. RASTETTER.

Witnesses:
MARIE E. LINDEMAN,
CHAS. K. STRINGER.